Figure 10:
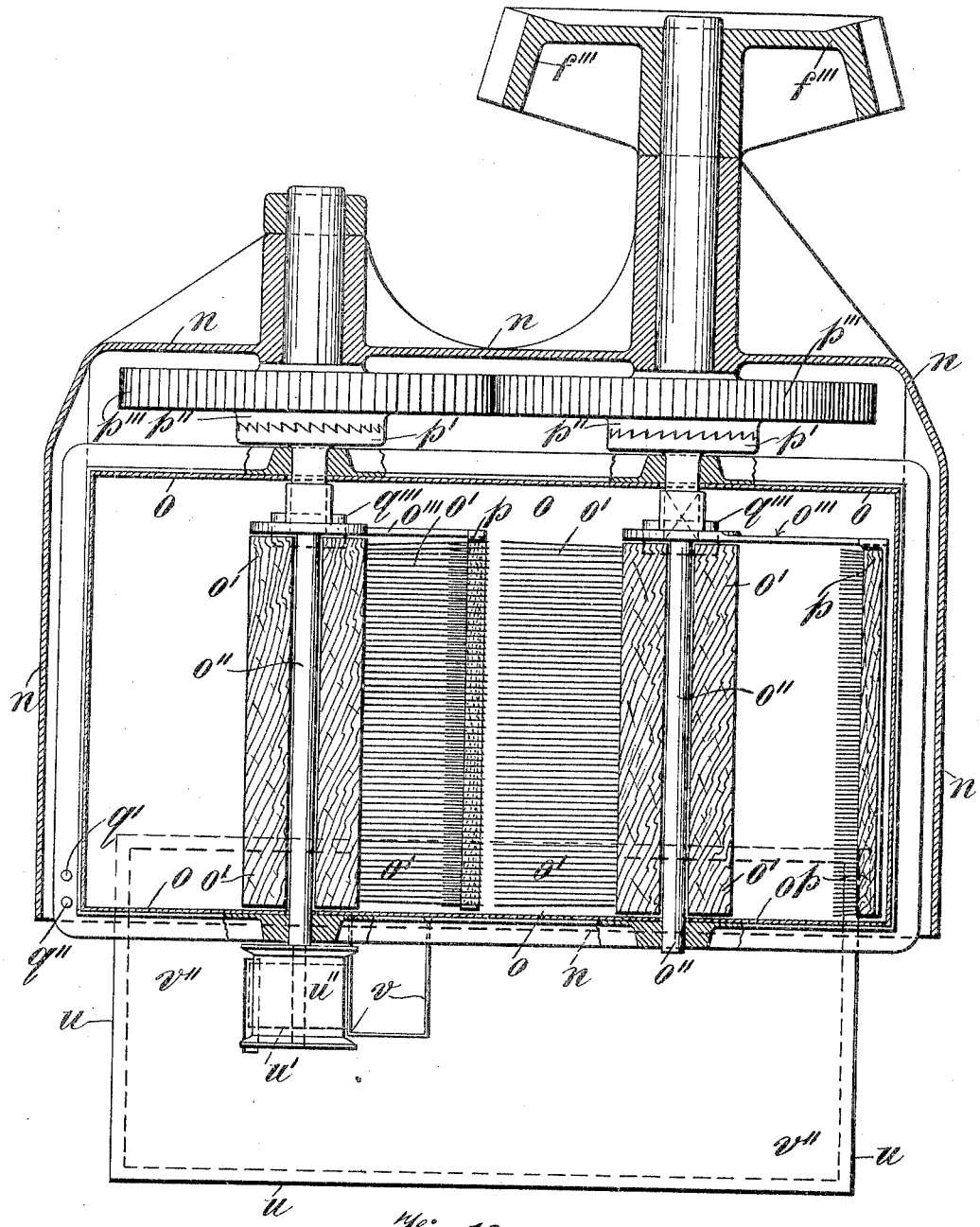

No. 804,425. PATENTED NOV. 14, 1905.
F. MOUNTFORD.
AUTOMATIC MACHINERY OR APPARATUS FOR DECORATING AND GLAZING
TILE AND OTHER ARTICLES OF POTTERY WARE, GLASS, &c.
APPLICATION FILED NOV. 10, 1902.
11 SHEETS—SHEET 1.
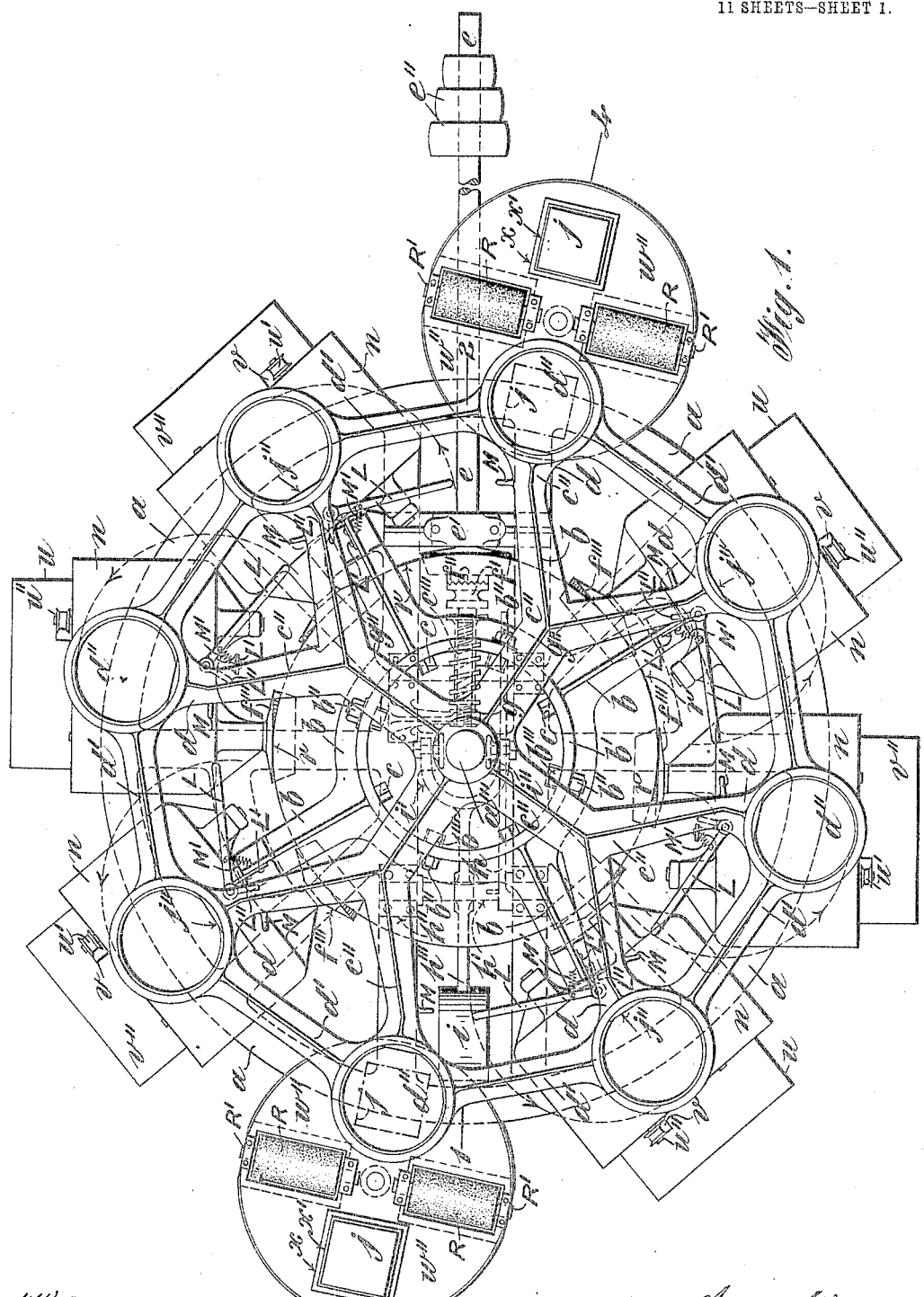

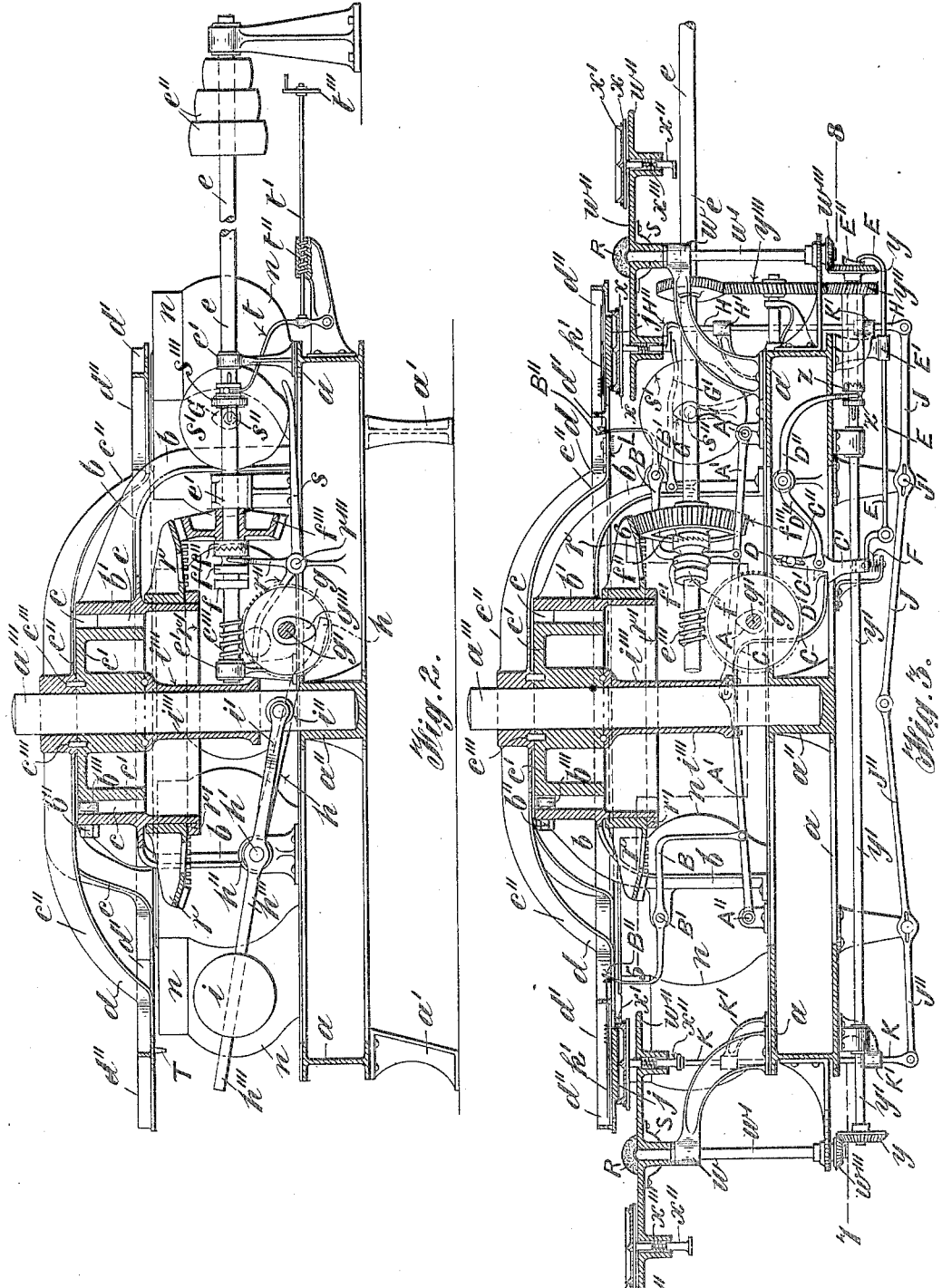

No. 804,425. PATENTED NOV. 14, 1905.
F. MOUNTFORD.
AUTOMATIC MACHINERY OR APPARATUS FOR DECORATING AND GLAZING
TILE AND OTHER ARTICLES OF POTTERY WARE, GLASS, &c.
APPLICATION FILED NOV. 10, 1902.
11 SHEETS—SHEET 3.
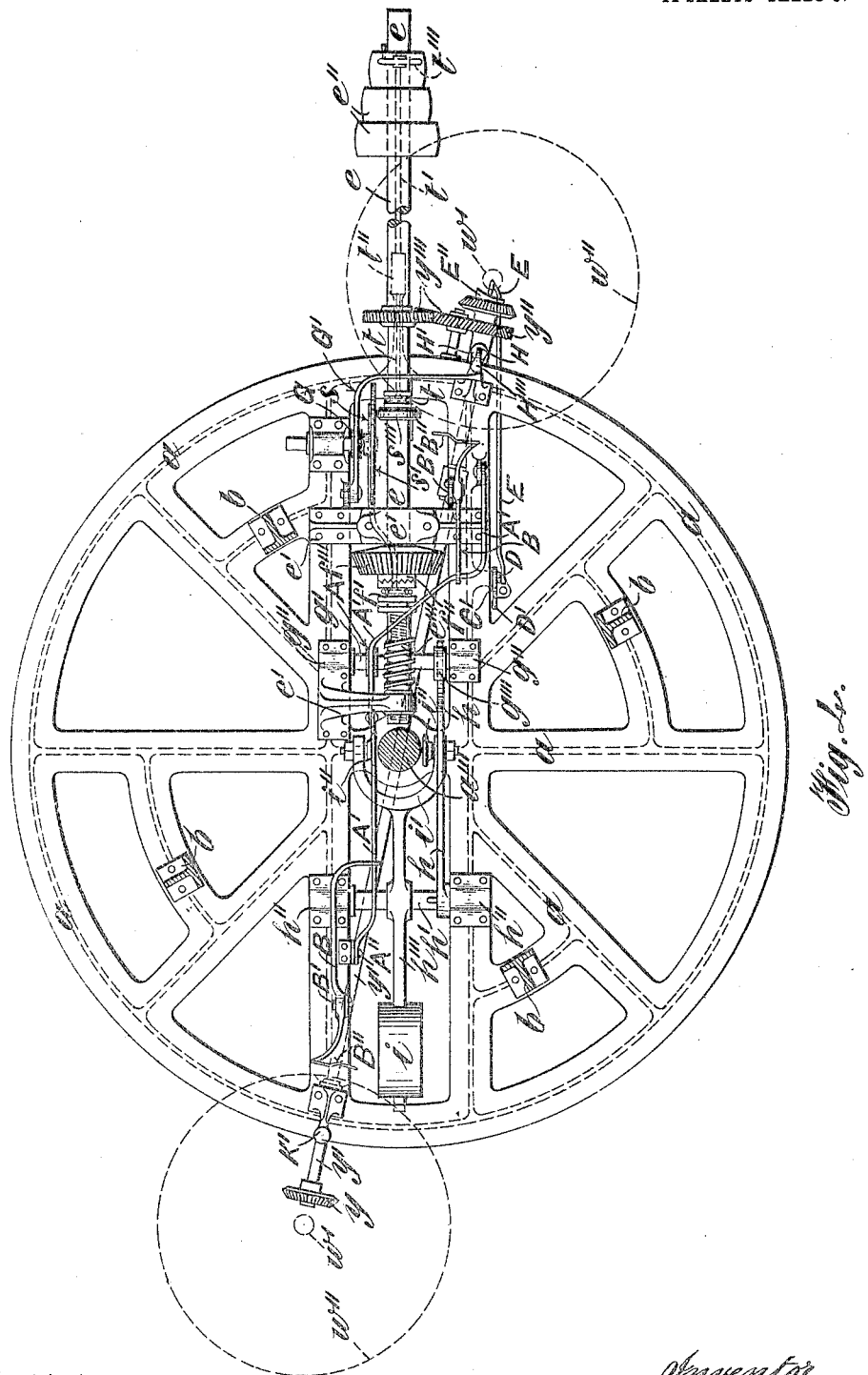

No. 804,425. PATENTED NOV. 14, 1905.
F. MOUNTFORD.
AUTOMATIC MACHINERY OR APPARATUS FOR DECORATING AND GLAZING TILE AND OTHER ARTICLES OF POTTERY WARE, GLASS, &c.
APPLICATION FILED NOV. 10, 1902.
11 SHEETS—SHEET 4.
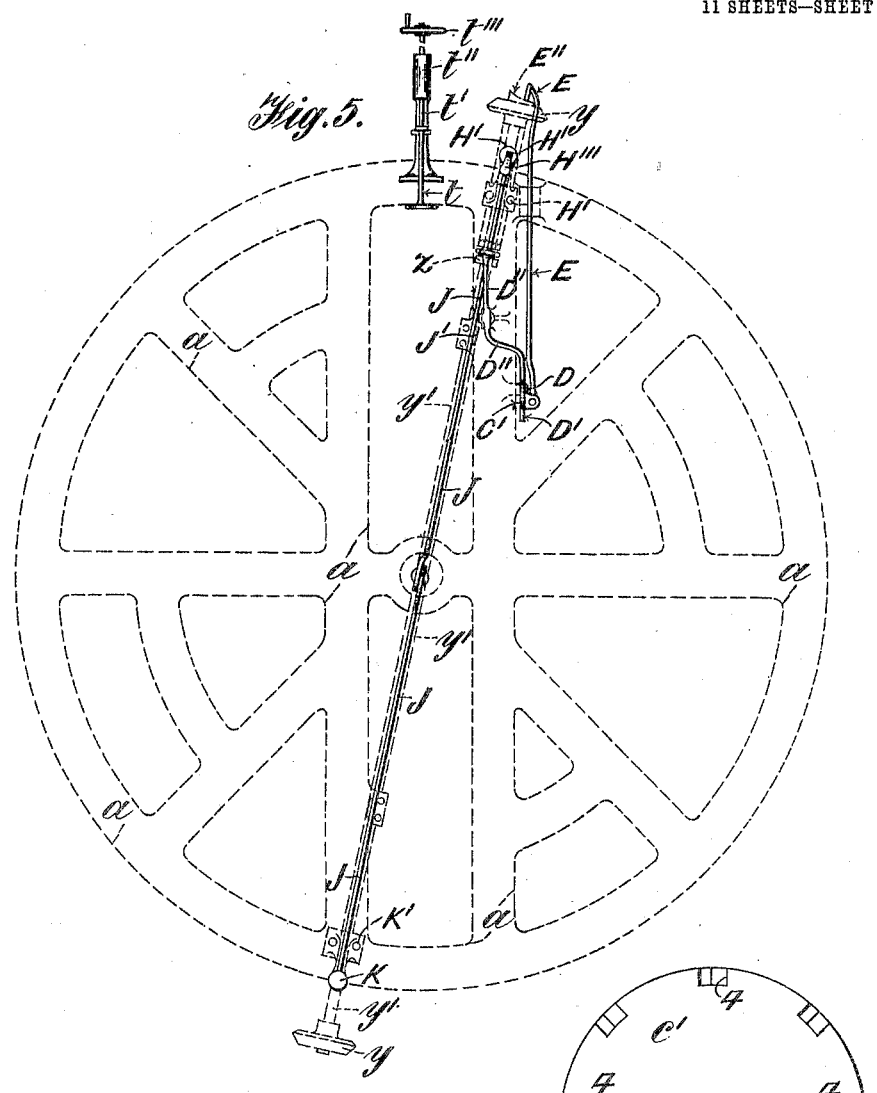
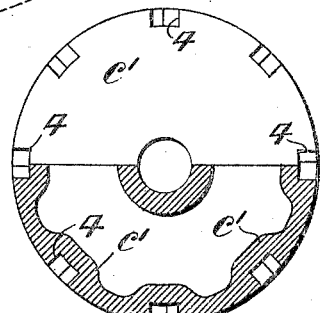
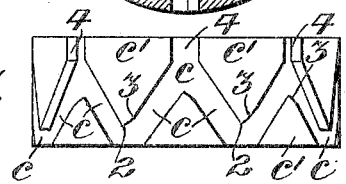

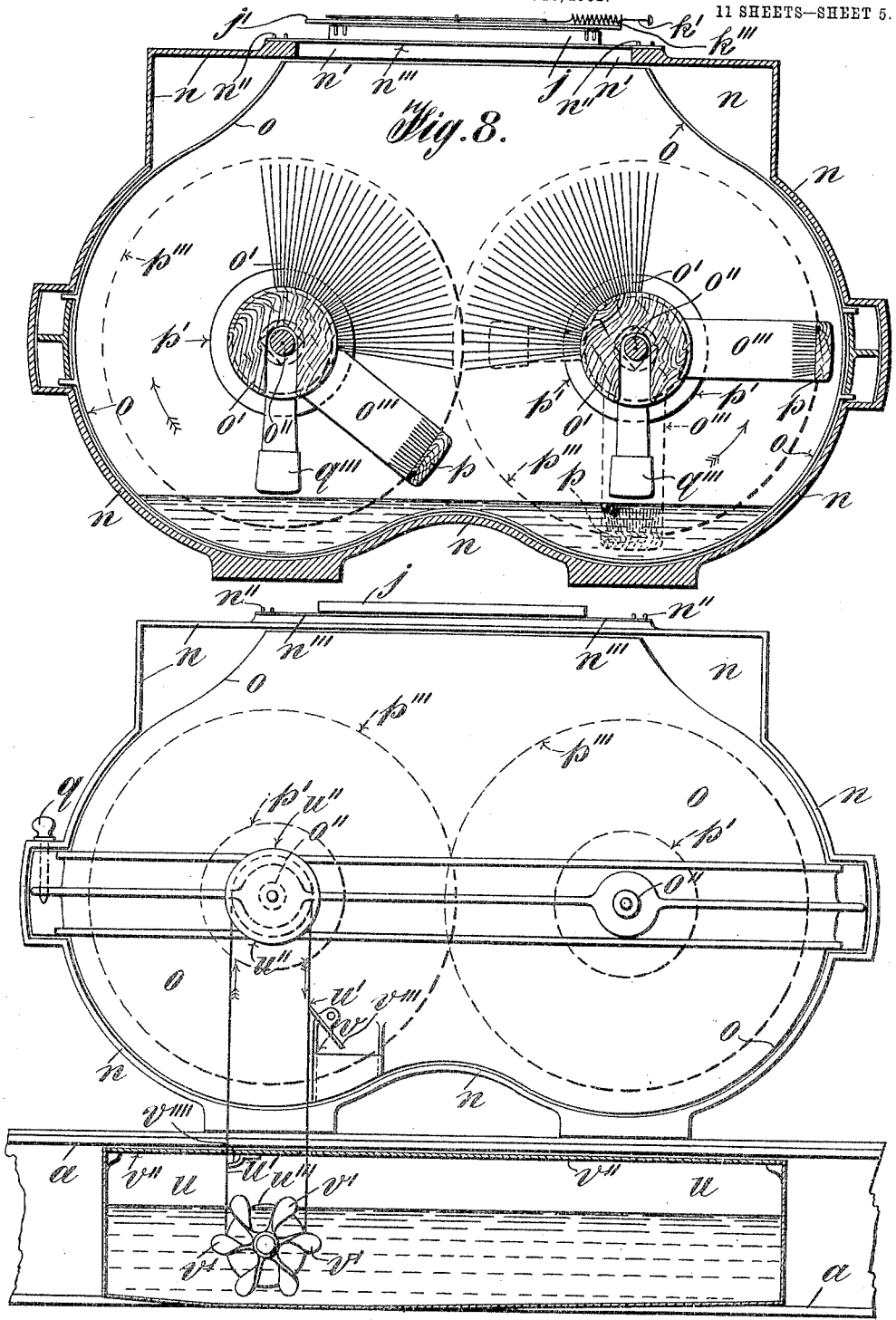

No. 804,425. PATENTED NOV. 14, 1905.
F. MOUNTFORD.
AUTOMATIC MACHINERY OR APPARATUS FOR DECORATING AND GLAZING
TILE AND OTHER ARTICLES OF POTTERY WARE, GLASS, &c.
APPLICATION FILED NOV. 10, 1902.

11 SHEETS—SHEET 3.

Witnesses
William A. Colebourn
Mabel Lee

Inventor
F. Mountford
By William T. Taylor
Atty.

No. 804,425. PATENTED NOV. 14, 1905.
F. MOUNTFORD.
AUTOMATIC MACHINERY OR APPARATUS FOR DECORATING AND GLAZING
TILE AND OTHER ARTICLES OF POTTERY WARE, GLASS, &c.
APPLICATION FILED NOV. 10, 1902.

11 SHEETS—SHEET 9.

Witnesses.
William A. Colebourn
Mabel Lee.

Inventor.
F. Mountford
By William D. Taylor
Atty.

No. 804,425.  
F. MOUNTFORD.  
PATENTED NOV. 14, 1905.

AUTOMATIC MACHINERY OR APPARATUS FOR DECORATING AND GLAZING TILE AND OTHER ARTICLES OF POTTERY WARE, GLASS, &c.

APPLICATION FILED NOV. 10, 1902.

11 SHEETS—SHEET 10.

Witnesses:  
William A. Colebourn  
Mabel Lee

Inventor:  
F. Mountford  
By William B. Taylor  
Atty.

No. 804,425. PATENTED NOV. 14, 1905.
F. MOUNTFORD.
AUTOMATIC MACHINERY OR APPARATUS FOR DECORATING AND GLAZING TILE AND OTHER ARTICLES OF POTTERY WARE, GLASS, &c.
APPLICATION FILED NOV. 10, 1902.

11 SHEETS—SHEET 11.

Witnesses.
William A. Colebourn
Mabel Lee

Inventor.
F. Mountford
By William W. Taylor
Atty.

UNITED STATES PATENT OFFICE.

FREDERICK MOUNTFORD, OF STOKE-UPON-TRENT, ENGLAND.

AUTOMATIC MACHINERY OR APPARATUS FOR DECORATING AND GLAZING TILE AND OTHER ARTICLES OF POTTERY-WARE, GLASS, &c.

No. 804,425.     Specification of Letters Patent.     Patented Nov. 14, 1905.

Application filed November 10, 1902. Serial No. 130,708.

*To all whom it may concern:*

Be it known that I, FREDERICK MOUNTFORD, a subject of the King of Great Britain and Ireland, residing at 17 Wood street, Stoke-upon-Trent, in the county of Stafford, England, have invented certain new and useful Improvements in Apparatus for Decorating and Glazing Tiles and the Like, of which the following is a specification.

This invention relates to novel apparatus for decorating or glazing tiles and other similar articles of pottery-ware, glass, metal, and other substances, but has especial reference to the decoration of tiles chiefly used for purposes of ornamentation in buildings and other places.

The principal objects of the invention are to carry out by automatic mechanical means the decoration or glazing of the objects referred to which have hitherto been decorated by hand, to cheapen production, to economize labor and time, to effect a better and more uniform decoration, and to largely minimize or entirely prevent lead-poisoning, which is very prevalent where hand decoration is resorted to with decorative or glazing materials containing lead.

Wherever the terms "glaze," "color," or "decorative material" are used in this specification they are to be understood as meaning any liquid or substance that can be sprayed, flipped, or brushed onto the object to be treated, and where the term "tile" is used it is understood to include any object that can be treated in the machine in a similar manner.

With the above objects in view the apparatus forming my invention, which will be especially described with reference to the decoration or glazing of tiles, principally comprises means for receiving and delivering the tiles, for holding them during decoration, and for presenting the tiles to receive the various decorative materials; means for releasing the tiles after decoration, and means for distributing the decorative materials on the tiles, together with various other details of construction which will be fully described and claimed hereinafter.

My invention will be fully described with reference to the accompanying drawings, which show a construction of machine in accordance with my invention; but I would here have it understood that the details of construction may be varied somewhat without departing from the essential features comprising the invention.

Figure 11:
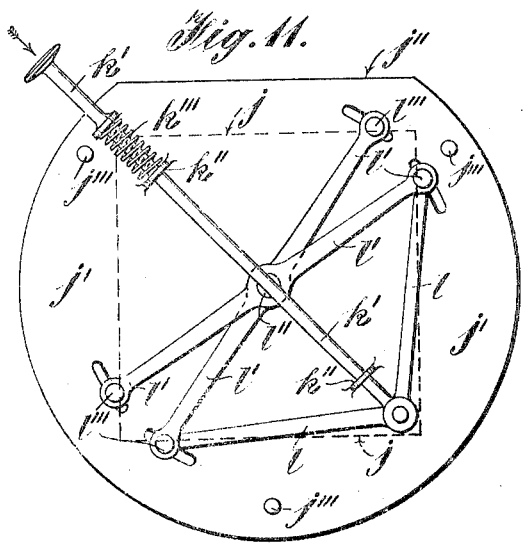
Figure 12:
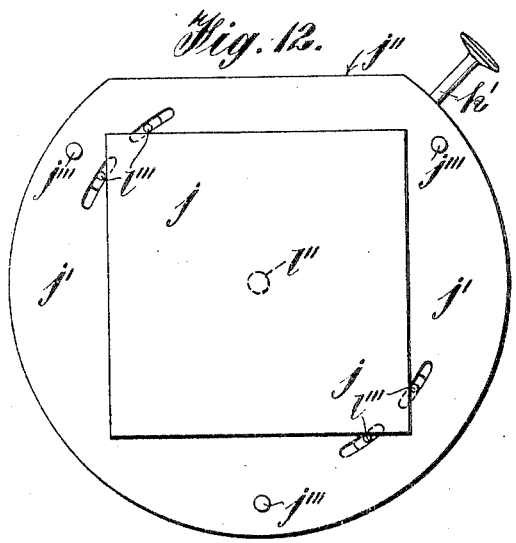
Figure 14:
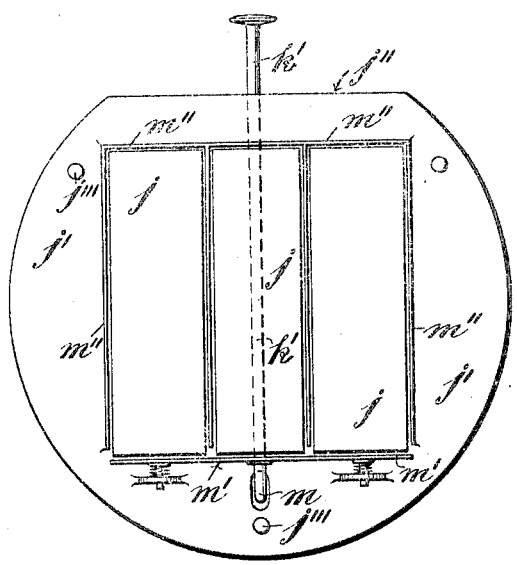
Figure 13:
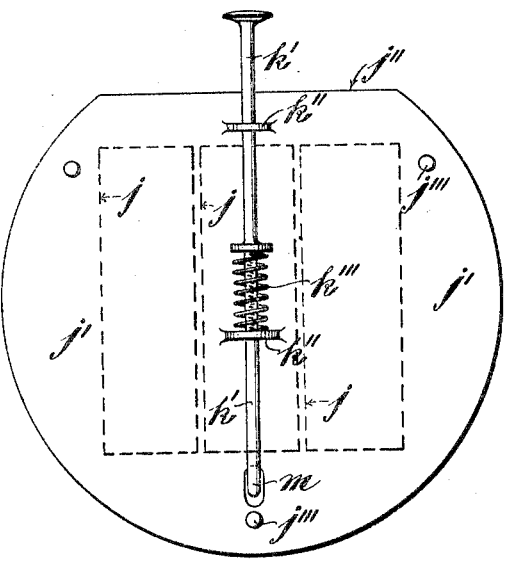
Figure 15:
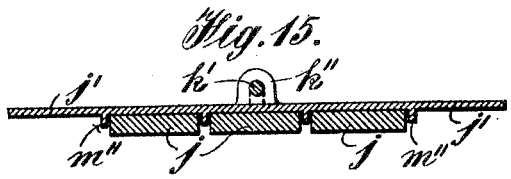
Figure 17:
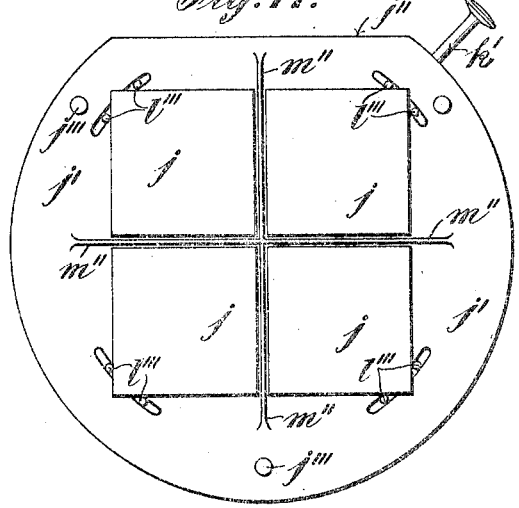
Figure 16:
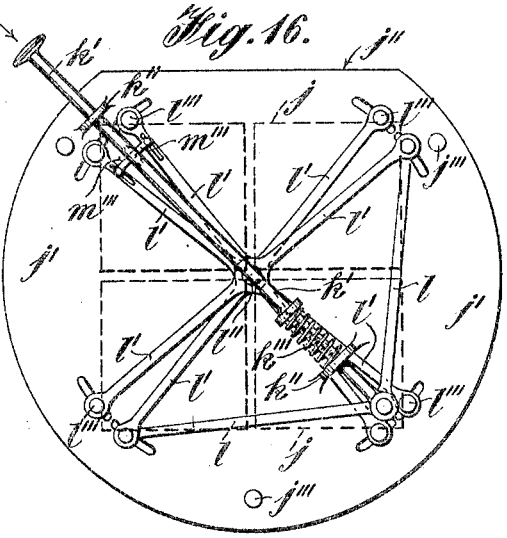
Figure 20:
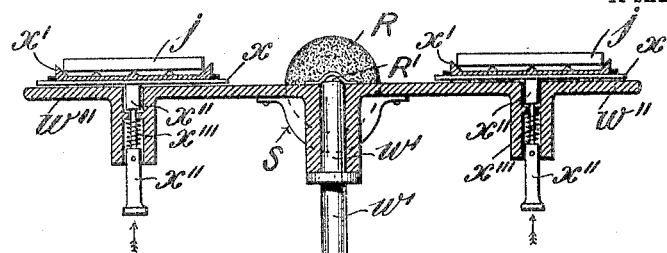
Figure 21:
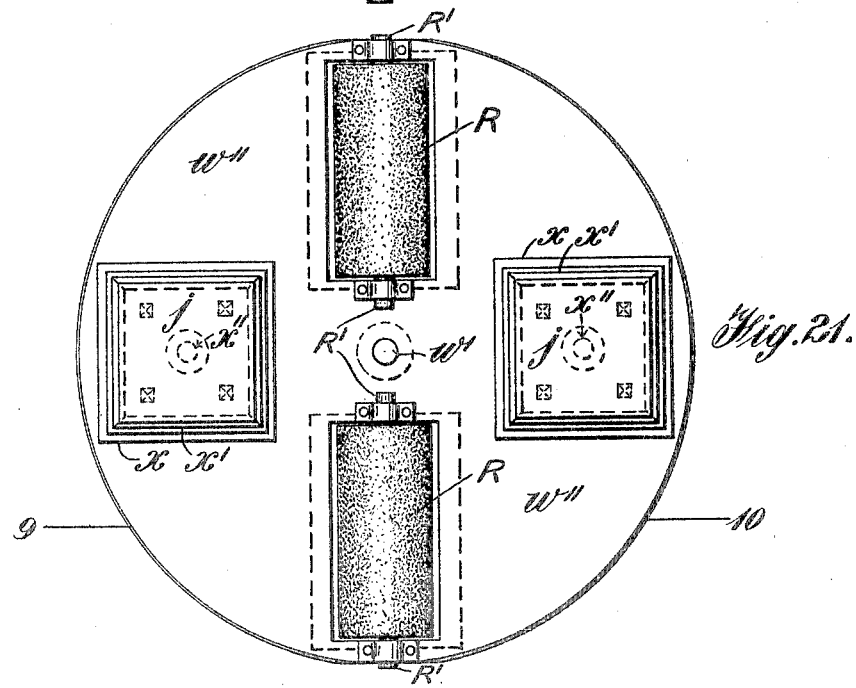
Figure 25:
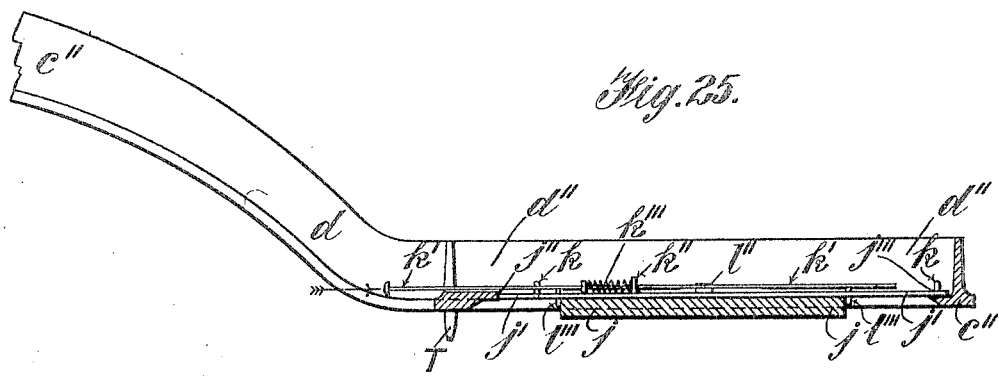
Figure 26:
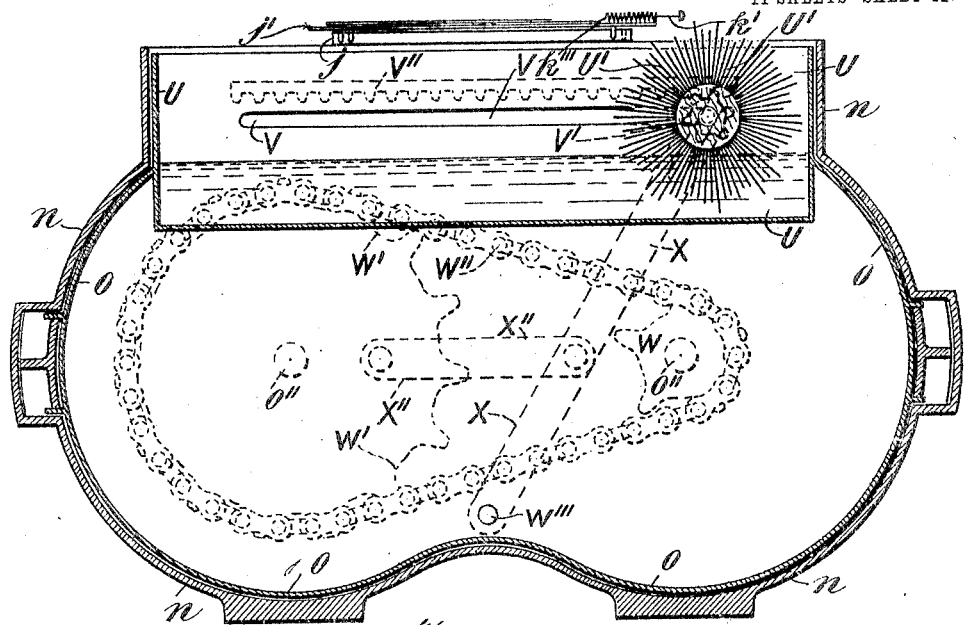
Figure 27:
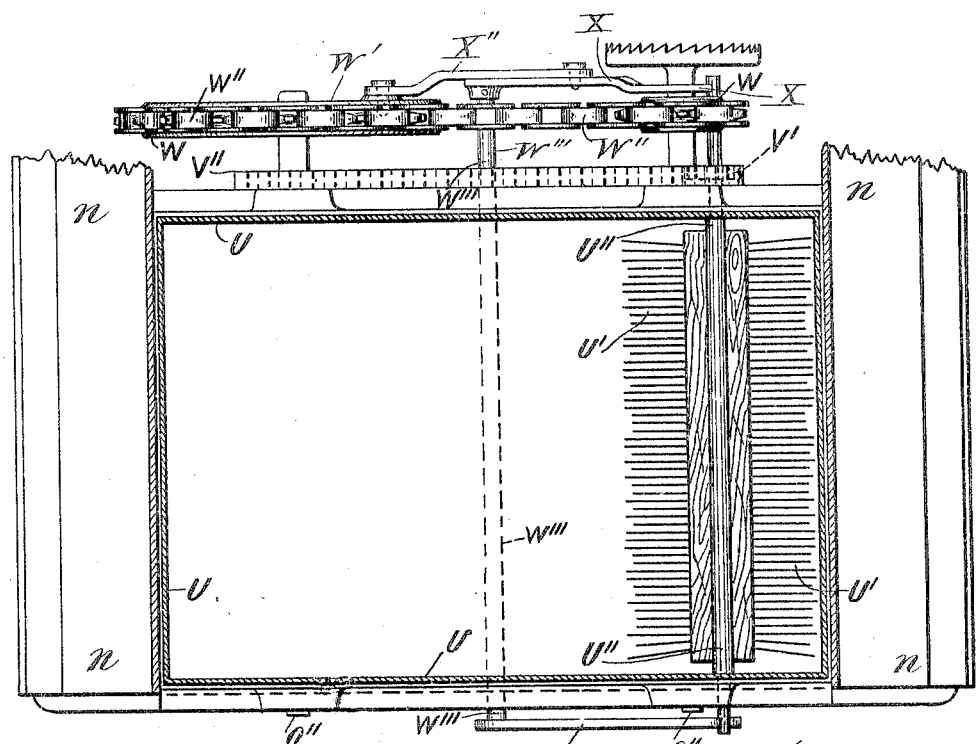

Figure 1 is a plan of the complete machine; Fig. 2, sectional elevation on line 1 2 of Fig. 1; Fig. 3, similar elevation on line 3 4 of Fig. 1; Fig. 4, plan on line 5 6 of Fig. 3; Fig. 5, plan on line 7 8 of Fig. 3; Fig. 6, plan, partly in section, of one of the operating-cams afterward referred to; Fig. 7, elevation of same; Fig. 8, sectional elevation of one of the boxes for containing decorative material and including the means for distributing the material on the tiles and showing also its inclosing case; Fig. 9, front elevation of same, including means for agitating and supplying decorative material; Fig. 10, sectional plan of the decorative-material box; Figs. 11 and 12, plan and inverted plan, respectively, showing the means for holding a six-inch-square tile during decoration; Figs. 13 and 14, similar views showing the means for holding tiles six inches by two inches; Fig. 15, cross-section of the last two figures; Figs. 16 and 17, plan and inverted plan of the means adopted for holding tiles about three inches square, and Figs. 18 and 19 similar views indicating the means for holding tiles six inches by three inches. Fig. 20 is a sectional elevation of one of the feed-tables and tile-carriers; Fig. 21, plan of same, and Fig. 22 sectional elevation of the table on line 9 10 of Fig. 21. Fig. 23 shows an example of a stencil; Fig. 24, a plan of a tile to be decorated; and Fig. 25 is an enlarged section of a portion of the transmitter-frame, showing the tile-carrying means. Fig. 26 is a sectional elevation of a modified construction of color or glaze box to be used when mottling or irregular coloring the tiles; and Fig. 27 is a plan of same, partly in section.

Referring to the drawings, $a$ is a frame or bed designed to carry the whole of the operative mechanism, and $a'$ represents legs supporting the bed. In the center of the latter is a boss $a''$, designed to support a central stud or shaft $a'''$, which may be stationary. Secured to the bed $a$ is a frame $b$, provided centrally with a circular hollow ring or boss $b'$, from the inner side of which project studs $b''$, carrying antifriction-bowls $b'''$, adapted to engage with the V-shaped grooves $c$, formed in the periphery of a cam $c'$, mounted loosely upon the stud $a'''$, the cam being capable of a rising and falling and rotary movement around the stud on which it is mounted. Above the cam $c'$ and also loosely mounted on the stud $a'''$ is a transmitter-frame $c''$, which partakes of all the same movements as the cam $c'$. It is kept in unison with the latter by pins $c'''$, fixed in the cam and engaging with holes in the boss of $c''$, though the frame and cam may be bolted together or made in one piece. Frame $c''$ has extending arms $d$ joining up to a rim $d'$, provided with internally-flanged holes $d''$ to receive and support the transmitter-plates (shown in Figs. 11 to 18) for holding the tiles during decoration. The number of holes may be varied. The object of the frame $c''$ is to carry round the tiles in a step-by-step action to receive the various decorative colors or glazes which are located in stationary boxes immediately below the holes $d''$. In the drawings the frame is shown in its lowermost position, where it is stationary for a short period while the colors are being applied to the tiles, after which it is raised and simultaneously traversed a portion of a revolution in accordance with the number of holes $d''$ and again lowered to the position indicated and then becomes stationary for another short period. This occurs after the application of each color or glaze.

The mechanism for effecting the movement just referred to will now be described.

$e$, Figs. 1 to 4, is the main driving-shaft of the machine, carried in bearings $e'$, secured to the bed $a$, and is constantly rotating. Its speed may be varied by a stepped cone-pulley $e''$. On the shaft is loosely mounted a worm $e'''$ and a clutch $f'$, sliding on a feather on the shaft, the clutch being shown in engagement with a clutch-face $f''$, formed on the bevel-pinion $f'''$, also loosely mounted on the shaft $e$.

When clutch $f'$ is out of gear with $f''$ and against a stop-collar $f$, the worm $e'''$, through the constantly-rotating shaft $e$, imparts motion to a worm-wheel $g$, fixed on a shaft $g'$, arranged in bearings $g''$ and carrying a cam $g'''$, adapted to control a lever $h$, fixed on a shaft $h'$, carried in bearings $h''$, such shaft also having mounted on it a lever $h'''$, provided at one end with an adjustable weight $i$ and at the other with a fork $i'$, carrying anti-friction-bowls $i''$, adapted to engage with the bottom or sides of a sleeve $i'''$, loosely mounted on a stud $a'''$, the sleeve in turn abutting against the boss of the cam $c'$ or against a series of balls forming a ball-bearing. As the cam $g'''$ rotates the lever $h$ rises and the bowls $i''$ come in contact with the sleeve $i'''$—through the agency of the weight $i$ forcing it against the cam $c'$—thereby lifting it and the transmitter-frame $c''$. During the lifting movement the V-shaped grooves $c$ in the cam (more clearly indicated in Figs. 6 and 7) engage with the bowls $b'''$, and in consequence the cam and transmitter-frame are given a rising and at the same time circular movement. When the points 2 of the cam $c'$ rise above the bowls, the slight impetus of the transmitter-frame $c''$, combined with its weight and that of the cam, causes the parts to descend to the stationary position, the right-hand portions of the cam-grooves engaging with the bowls on the downward motion. The engaging of the two portions of the grooves $c$ with the bowls on the upward and downward travel is facilitated by curving the grooves a little at 3. The straight portions of the groove 4 are engaged by the bowls when the transmitter-frame is reaching its lowest position, so that the two combined enable the frame and tiles carried by it to correctly register with the stencil-plates, afterward referred to, while the tiles receive their decorative materials, though correct registration is further insured by pins T in the transmitter-frame engaging with corresponding holes in the color or glaze box cases, afterward referred to.

The mechanism for receiving and holding the tiles to be decorated is clearly shown in enlarged views in Figs. 11 to 19. Referring principally to Figs. 11 and 12, the tile $j$, which is usually provided with a pattern in relief, is carried by transmitter-plates $j''$, each of which fits in a hole $d''$ of the transmitter-frame $c''$, a portion of the plate being cut away at $j'''$, so that it is always placed in position the right way. Holes $j''''$ are also provided to engage with pins $k$, Fig. 25, fixed in the frame $c''$, such pins allowing the plate to rise on them slightly as the transmitter-frame descends if the tiles vary in thickness and also correctly register the tiles with the stencils, this being also insured by the pins T. The tiles are placed on the plates so as to present their faces downward. At the top side of plate $j''$ is the gripping device, consisting of a rod $k'$, carried in bearings $k''$, between one of which and a collar on the rod is a spring $k'''$. The opposite end of the rod is coupled to two links $l$, the other ends of which are connected, respectively, to one end of each of two levers $l'$, pivoted on a pin $l''$, carried by the plate $j''$. The levers $l'$ have downwardly-projecting pins $l'''$, which pass through slots in the plates $j''$. When the rod $k'$ is pushed in the direction of the arrow, the pins $l'''$ are opened apart and a tile placed between them and gripped by the action of the spring $k'''$ on releasing the rod. The two figures just described indicate the device employed for holding one square tile.

Figs. 13 to 15 show the means adopted for holding three narrow tiles, the same letters of reference being used for similar parts. Herein the rod $k'$ has its end $m$ passed through a hole in plate $j''$ and connected to a spring-controlled plate $m'$, which, in conjunction with spring $k'''$, presses the tiles against projecting ribs $m''$, formed on the under side of the plate $j''$.

Figs. 16 and 17 indicate means for holding four square tiles which are practically similar to the device in Figs. 11 and 12, except that the levers $l'$ are in duplicate and the rod $k'$ is additionally provided with a cross-bar $m'''$ engaging with slots formed in two of the levers to open and close, as required. Projecting ribs $m''$ are provided for the same purpose as in the device shown in Figs. 13 and 14.

Figure 19:
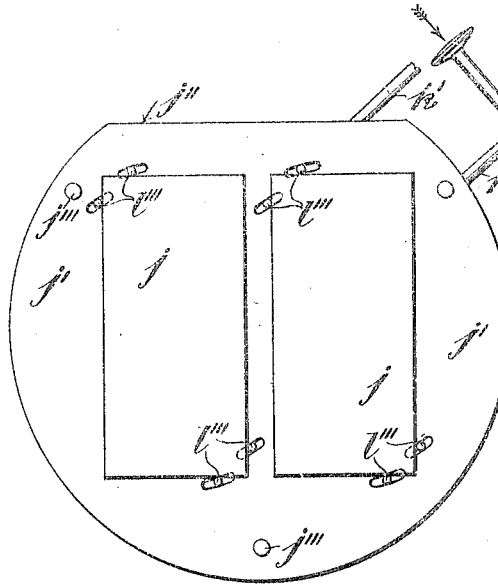
Figure 18:
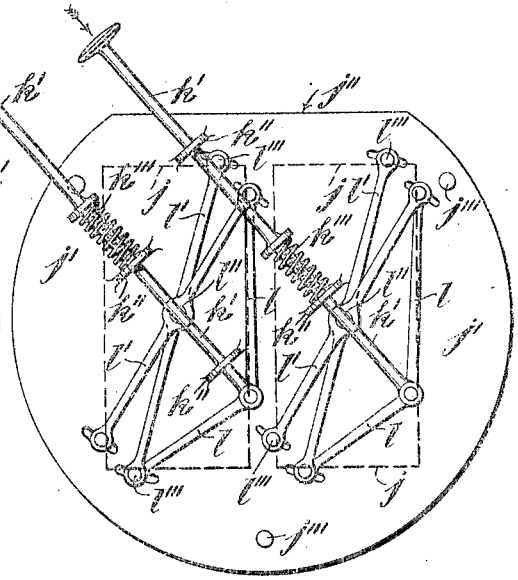

Figs. 18 and 19 indicate exactly similar means to those in Figs. 11 and 12 for holding two tiles, the devices merely being in duplicate.

The decorative materials, colors, or glazes may be of the usual kind or such as can be freely sprayed, flipped, or brushed onto the tiles, and each is contained in a separate box or receptacle from which it is flipped, sprayed, or brushed onto the tile. The boxes are indicated in Figs. 1 to 3 and shown in enlarged detail in Figs. 8 to 10, together with the spraying or flipping mechanism and means for keeping the receptacle supplied with color. On the bed $a$, beneath each hole in the transmitter-frame, except as later mentioned, is fixed a stationary casing $n$, (see particularly Figs. 8 to 10,) provided on its top side with a hole $n'$ somewhat larger than an ordinary six-inch tile. Above it and held in position by pins $n''$ is a stencil-plate $n'''$ of suitable construction, according to pattern, upon which the tile $j$ in its transmitter-plate $j'$ may rest when the transmitter-frame is in its lowest and for the time being stationary position. When in this position, the tile acts as a seal to the color or glaze receptacle and prevents the color or glaze from escaping from the color-receptacle except through the pattern or patterns in the stencil-plate and upon the tile.

$o$ is the box or receptacle for containing the color, adapted to have a sliding fit in the casing $n$, so as to be readily interchangeable for a receptacle containing another color when desired. In the box are two stationary brushes $o'$, and passing loosely through their stocks and journaled in the ends of the box are two shafts $o''$, to each of which is fixed an arm $o'''$, having projecting from it a second arm or stock $p$, provided with bristles or a trough-shaped device capable of lifting up color from the bottom of the box onto the brushes $o'$ when they are rotated in the direction of the arrows in Fig. 8. To rotate the shafts, I fix on each a half-clutch $p'$, engaging with a similar clutch $p''$, formed integral with a wheel $p'''$, each pair of the latter being geared together and carried in bearings in the casing $n$, the center stud, shaft, or boss of one wheel having also fixed on it a bevel-pinion $f^{10}$. The mechanism for rotating the latter will be referred to shortly; but for the present it may be said that the rotary motion imparted causes the arms $p$ to rotate and their bristles to lift up color or glaze onto the brushes $o'$, and as they do so the bristles of the latter are bent downwardly. As the arms pass the bristles the latter assume their normal or straight position, in doing which the color or glaze is flipped or sprayed in an upward direction through the spaces forming the pattern in the stencil-plate $n'''$ onto the tile $j$. The clutches $p' \ p''$ are normally held in gear by a pin $q$ passed through holes $q'$, Fig. 10, in the casing $n$ and box $o$, though they can be held out of gear when the particular color is not required by withdrawing the box $o$ somewhat and placing the pin in a second hole $q''$. In order that the arms $o'''$ and stocks $p$ may always occupy the same relative position as indicated in Fig. 8 (which is necessary to prevent them colliding when passing the center between the brushes $o'$) I form integral with the arms $o'''$ weights $q'''$ at different angles to the latter, as indicated.

I will now describe the means for driving the bevel-pinions $f^{10}$, each of which is indicated in position in Fig. 1. In gear with them is a bevel-wheel $r$, loosely mounted on the boss $b'$ and held in position by a ring $r'$. The main shaft $e$, on which the bevel-pinion $f'''$ is loosely mounted, is, as before remarked, constantly rotating; but as color or glaze only requires to be applied to the tiles while they and their carrying-frame are stationary I provide means for intermittently rotating the pinions. This consists of the clutches $f' \ f''$, previously described and which are shown in gear for rotating the pinions in Figs. 1 to 4. The sliding clutch $f'$ is placed in gear by means of the forked and weighted lever $r''$, pivoted at $r'''$ and provided with an arm $s$, extending to and beneath a cam and friction disk $s'$, mounted on shaft $s''$, the cam being driven by an adjustable friction-roller $s'''$, mounted on the shaft $e$. So long as the sliding clutch $f'$ remains in gear with clutch $f''$ color is being sprayed or flipped on the tiles, as previously described; but as I require to vary the time during which color shall be applied according to the work in hand I employ the adjustable friction-roller $s'''$. This can be moved nearer to or farther from the center of the disk $s'$ by the pivoted forked rod $t$ and the screw-threaded shaft $t'$ and nut $t''$, operated by the hand-wheel $t'''$. Thus the time during which the raised portion of the cam-disk $s'$ is in contact with the arm $s$ may be regulated as described. When the raised portion has passed, the weight on the lever $r''$ disengages the clutches $f' \ f''$ and the spraying of color is stopped.

To keep the color-boxes supplied at a constant level with colors, each has adjacent to it a color-supply vessel $u$, Figs. 1, 9, and 10, from which the color is lifted by a narrow endless band $u'$, passing over a pulley $u''$ on one of the shafts $o''$ and down into the vessel $u$, a spiked or roughened roller or bobbin $u'''$ being placed in the loop of the band to keep it taut. As the band rotates the color is conveyed and is removed from it by contact with the edge of a scraper $v'''$, down which it runs through a spout $v$ into the box $o$. The color on the inside of the band is removed by a scraper $v''''$ and drops back into vessel $u$. $v'$ represents vanes on the roller $u'''$ to keep the color in a state of agitation and to prevent sediment. The vessel $u$ is inclosed by a cover $v''$, which may be extended round the band $u'$ and spout $v$.

As it is important to supply the tiles and to take them away from the transmitting and decorating mechanism quickly and regularly, I have devised automatic means for accomplishing these objects. These are indicated in Figs. 1, 3, 4, 5, and partly in enlarged detail in Figs. 20 to 22. From these it will be seen that arranged in bearings $w$, attached to the bed $a$, are shafts $w'$, carrying at their upper ends tables $w''$, each provided with tile-carriers. Each of the latter comprises a plate $x$, surmounted by a rubber or felt mat $x'$, on which the tiles may be placed by hand and removed after decorating. The plate has a shank $x''$ engaging with a boss in the table, the said shank being divided and provided with an interposed spring $x'''$ to allow of a little vertical compression to suit the varying thicknesses of tiles as they are being automatically transferred from the plates $x$ to the gripping-pins $l'''$ or the transmitter-plates. At the lower ends the shafts $w'$ carry bevel-wheels $w'''$ in gear with similar wheels $y$, fixed on a shaft $y'$ below the bed $a$, the same shaft having loosely mounted thereon a wheel $y''$, to which motion is constantly transmitted by a gear-train $y'''$ from the main shaft $e$ of the machine. Also mounted on and slidable on a feather on the shaft $y'$ is a clutch $z$, engaging with teeth on the boss of wheel $y''$. The clutch is indicated in gear for causing the table $w''$ to rotate. Their motion is half a revolution only of tables $w''$ at a time, the object being to receive a decorated tile released from the gripping-pins $l'''$ through the agency of mechanism to be presently described, then to rotate, stop, and present an undecorated tile to the gripping-pins $l'''$, the operatives while the tables are stopped removing the decorated tiles from the mats and substituting undecorated or partly-decorated tiles prior to the next movement.

In describing the action of the transmitter-frame $c''$ I said it descended to a state of rest in its lowest position. In doing this and while the straight portions of the grooves $c$ engage the rollers $b'''$ it releases the tiles from the gripping-pins $l'''$ of the transmitter-plates and almost simultaneously therewith puts the clutch $z$ into gear with its counterpart in wheel $y''$, so as to cause the tables $w''$ to turn half a revolution. The first object is accomplished in conjunction with other mechanism timing with it. This mechanism is as follows: On the shaft $g'$, previously referred to, is fixed a cam A, Fig. 3, which lifts up two levers A′, pivoted at A″ and coupled together at their center. This is done just as the frame commences to descend. The levers A′ have coupled to them levers B, pivoted at B′ and provided with inclined ends B″. As the transmitter descends when the levers B are in the position indicated the ends of the rod $k'$ of each transmitter-plate over the table $w''$ comes into contact with the end of lever B″, and thereby the pins $l'''$ of the plates are forced apart and the decorated tiles are released and received by the mats $x'$. The levers B hold the grippers open until the tables have turned the half-revolution and fresh tiles have been raised into position to be gripped by the pins $l'''$, when the cam A lowers the levers A′ and allows the rods $k'$ to be forced outward by their springs $k'''$ and the pins $l'''$ grip the tiles. When only one feed-table is used and tiles are being decorated with more than three colors, one of the levers B can be disengaged or removed to allow the tiles to pass without releasing them. The second mechanism, Figs. 3 and 5, operated by the descent of the transmitter-frame, is arranged as follows: The sleeve $i''''$ on the central stud on shaft $a'''$ has fixed to it a rod or bracket C, and located near the free end of it is a lever C′, provided with a slot C″, embracing a stud D. This lever is also provided with a catch D′ and is furthermore coupled to one end of a pivoted lever D″, the other end of which engages the clutch $z$. It is also coupled to one end of a rod E, slidable in a bearing E′, the other end of which is designed to come into contact with a face-cam E″, formed on one of the bevel-wheels $y$, fixed on shaft $y'$. A spring F always tends to lift the lever C′ into the broken-line position indicated, and thus throw the clutch $z$ out of gear. Before the descent of the transmitter-frame the lever C′ is in the position just referred to. Consequently the bracket C engages with the catch D′ and depresses it, thus throwing the clutch $z$ into gear, when the half-revolution of the tile-feeding tables takes place. As this is being accomplished the face-cam E″ is acting on the rod E, drawing it forward through its bearing, and so withdrawing the catch D′ from beneath the lever C′. So soon as this is done the spring F forces the lever C′ upward and disengages the clutch $z$ just as the undecorated tiles are brought beneath the transmitter-plates. Another mechanism now comes into action, for it is necessary to lift the undecorated tiles into position to be gripped by the pins $l'''$ of the transmitter-plates immediately the tile-feeding tables have stopped rotating and before the levers B are withdrawn from holding the rods $k'$. This is carried out, Figs. 2, 3, and 4, by means of a second cam G, fixed on shaft $s''$, such cam engaging a pivoted lever G′, the free end of which is designed to come under and lift up the shank $x''$ and tile-carrying plate, as shown in Fig. 3, to enable the tile to be gripped by the pins $l'''$, as before explained. The lifting of one shank and plate is communicated to the corresponding plate at the other side of the machine by a rod H, slidable in bearings H' and having at its upper end a projection H'' to engage with the end of lever G'. At the lower end the rod is coupled to one end of a lever J, pivoted at J', the other end of the lever being coupled to a corresponding pivoted lever J'', whose other end is connected to a rod K, carried in bearings K' and corresponding to rod H, except that its upper end simply engages with the lower end of the shank $x''$ to lift it simultaneously with the rising of the one at the right-hand side of the machine. After the tiles are gripped by the pins $l'''$ of the transmitter-plates the cam G is timed to move away from the lever G', when the latter and rods H and K drop down of their own weight, assisted by the springs $x'''$ of the shanks $x''$, ready for the next operation.

In order to remove any color or glaze which may percolate through to the face or top of the stencil-plates $n'''$ during the decorating operation, I employ brushes L, Figs. 1 and 3, pivoted to brackets L', secured within to the casing $n$ of the color-boxes or to the stationary frame $b$. On the transmitter-frame $c''$ I fix projections or studs M, so that as the frame revolves these come in contact with the short arms L'' of the brushes L and traverse them across the stencil-plates in the direction of the arrows, as indicated in Fig. 1. After the projections pass springs M' bring the brushes back to their normal position. The brushes may come in contact with a suitable cleaning device on their backward movement, if desired, and trays may be provided to catch any drops of color or glaze. Water-pipes may also be arranged to wet the brushes also, if found desirable.

Figure 22:
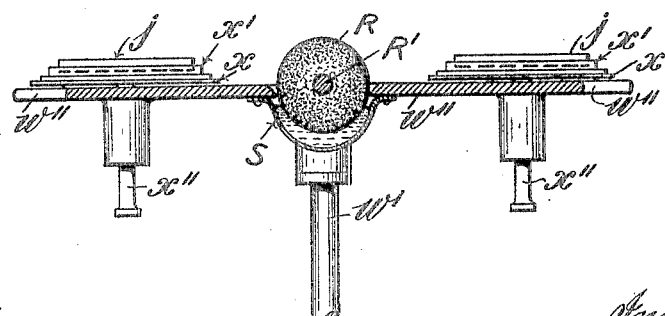
Figures 23, 24:
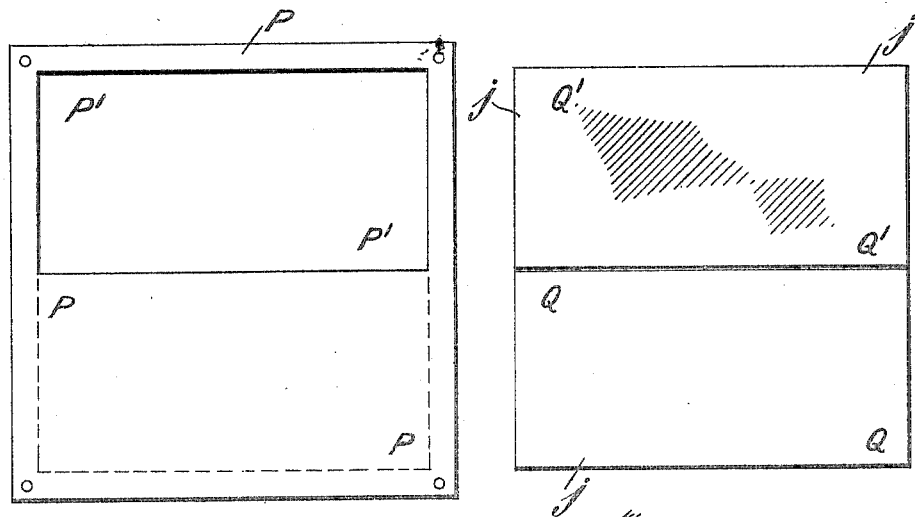

Any color or glaze getting onto the under side of the transmitter-plates may be removed by felt or like rollers R, Figs. 20 to 22, carried by the table $w''$, provided with water-troughs S. As the table $w''$ rotates one of the rollers R comes in contact with the transmitter-plate after the latter has released the decorated tile and before the next undecorated tile is presented for being gripped.

Where I desire to give a mottled or marbled effect to tiles, I may substitute for one or more of the ordinary glaze-boxes $o$ a somewhat similar shaped box, as indicated in Figs. 26 and 27, in which like letters indicate similar parts. In this case the upper portion of the box $o$ is provided with a color or glaze tank U, in which a brush U', having bristles or pieces of rubber of different lengths, is arranged. The center spindle U'' of the brush is supported in slots V and, moreover, carries a pinion V', adapted to engage with a rack V'', attached to the side of the tank. The tiles are carried in the manner already described, and one is shown in position above the tank. The brush U' is traversed beneath the tile while it is stationary, and the bristles pick up glaze or color and transfer it in more or less irregular lines to the face of the tile. The brush is moved beneath the tile through the agency of the usual shafts $o''$, one of which may be connected, by means of clutches $p'$ and $p''$, to the shaft supporting the driving-bevel $f''''$, as in Figs. 8 and 10. Instead of having spur-wheels on the shafts $o''$ I arrange chain-wheels W W' and connect them by a chain W''. Intermediate between the wheels is a shaft W'''', carrying levers X, the upper ends of which are slotted to embrace the center spindle U'' of the brush U'. One of the levers is connected to the chain-wheel W' by a link X''. From the foregoing description the operation of the parts will be readily understood. The strokes of color to form the mottled effect may be placed on the tile either previous to or after the application of any other colors or glazes required to decorate the tile.

The stencil-plates used are perforated with patterns or portions of complete patterns in accordance with the character of the design on the tiles to be decorated and the number of colors required in the finished tiles. The arrangement will be understood by a simple illustration with reference to Figs. 23 and 24. The former is a plan of a stencil-plate and the latter of a tile to be decorated with, say, two colors. One half of the plate P is solid, while the other half P' is cut away. The solid portion prevents access of color to the half of tile Q. The latter allows access to the half Q'. The first color is received at the first color-box and the second at the next; but in the latter the stencil is solid where the first stencil is open and open where the latter is solid. The same principle obtains no matter what the number of colors are or the character of the pattern, though the whole of the stencils for one particular pattern and number of colors are made to correctly register.

Although the operation of the various parts has been referred to in detail in the course of describing the construction of the machine, I will now briefly refer to the general operation of the machine.

An operative is located at each of the feed-tables $w''$; but prior to starting the machine an undecorated tile is placed by hand in the transmitter-plates immediately above the tables and another in the tile-carrier plates at the outer side of each table, the other tile-carrier plates nearest the machine being empty. Imitation tiles or blanks may be put in the remaining transmitter-plates or the color-boxes be put into gear consecutively by hand. The color-boxes having been supplied with different coloring materials, the machine is set in motion, the clutch $f'$ being in gear, as shown. Colors are therefore simultaneously flipped or sprayed through the stencils onto the tiles, the duration of spraying and quantity being determined by the differential friction-gear. The rotation of the cam-disk $s'$ then allows the clutch $f'$ to be taken out of gear to stop the application of colors, when the cam $g'''$ on shaft $g'$ continuing its rotation allows the weight $i$ to operate to lift the cam $c'$ and transmitter-frame $c''$, taking the latter away from the stencils and traversing it a portion of a revolution, when it descends and places each tile over the next succeeding color-box to receive another color. While the ascent and rotation of the transmitter-frame is taking place the stencils are cleaned by the brushes L and the levers B are brought into position for operating the tile-gripping mechanism. The transmitter-frame now descends and the tiles which have completed their circuit between the feed-tables are liberated and received by the mats of the tile-carrier plates $x$. A further downward movement of the frame places the clutch $z$ in gear to rotate the feed-tables half a revolution, removing the decorated tiles to the position occupied by the undecorated ones and the latter to the position formerly occupied by the decorated tiles and at the same time cleaning the transmitter-plates by means of rollers R. The cam $E''$ on completion of the half-revolution disengages the clutch $z$. The decorated tiles are removed from the mats by hand and further undecorated or partly-decorated tiles substituted, while those brought into position beneath the transmitter-frame are now lifted up to be gripped by the pins $l'''$ of the gripping mechanism by the operation of cam G. A further movement of the latter enables the tile-carrier plates to descend and the cycle of operations is completed, though it should be understood that the movements of the feed-tables, tile-carrying plates, and transmitter-cleaners take place during the time color is being sprayed onto the tiles. Each color applied dries almost instantaneously.

Any portion of the machine may be cased in or provided with protecting-covers where necessary or advisable to remove any liability of lead colors escaping, to the danger of operatives, and to keep the machine clean.

In conclusion, I would have it understood that I do not limit myself to the number, size, shape, and general construction of color-boxes and transmitter-plates that may be used in any one machine. These may be varied in accordance with the class of tile or other object to be decorated or glazed. Nor do I confine myself to the number of feed-tables, and although I have shown two tables in the drawings I may dispense with one and substitute for it another color-box. Two tables, as indicated in the drawings, enable tiles having each three separate colors or glazes or shades of colors or glazes to be decorated simultaneously, while in the case of one table being used the same machine indicated would decorate tiles with six or seven colors, the second table being disconnected from its driving-gear or entirely removed from the machine. Further, I may dispense with the whole of the automatic feed mechanism and place the tiles or other articles in and remove them from the transmitter-plates by hand. Other details of construction may be departed from without affecting the spirit of the invention, and the parts may be made of any material suitable for the machine. After decoration the tiles are removed to the kilns and fired in the usual way.

What I claim as my invention, and desire to protect by Letters Patent, is—

1. A machine for decorating and glazing tiles and other similar articles of pottery-ware, glass, metal and other objects comprising a bed or frame a central shaft carried thereby, a frame capable of having a rising and falling and rotary movement about said shaft, tile gripping or holding mechanism carried by said frame, a cam mounted on the shaft and provided with grooves, a stationary frame carrying rollers engageable with said grooves and adapted to cause the tile-carrying frame to have a step-by-step rotary movement, a rotary cam, a pivoted weighted lever operated thereby to lift the tile-carrying frame, means for opening and retaining open the tile-gripping mechanism while a decorated tile is discharged and an undecorated tile placed in position, means for spraying, flipping or brushing decorative material onto the tiles, means for operating the spraying flipping or brushing mechanism and for taking it out of action as required, means for determining the length of time during which the spraying mechanism shall be in action, means for adjusting the timing mechanism, means for presenting the tiles to and receiving them from the tile-carrying frame and means for operating the tile presenting and receiving means substantially as described.

2. A machine for decorating or glazing tiles and other similar articles of pottery-ware, glass, metal and other objects, comprising a bed or frame, a central shaft carried thereby a tile-carrying frame capable of having a rising and falling and rotary movement about said shaft, tile gripping or holding mechanism carried by said frame, means for giving the tile-carrying frame a rising and falling and step-by-step rotary motion, means for spraying, flipping or brushing decorative or glazing material onto the tiles, means for operating the spraying flipping and brushing mechanism and for taking it out of action as required, means for determining the length of time during which the spraying mechanism shall be in action and means for adjusting the timing mechanism substantially as described.

3. In a machine for decorating or glazing tiles and the like, a frame or bed, a central shaft carried thereby, a tile-carrying frame mounted on said shaft, means for giving the frame a step-by-step rotary motion and a raising and lowering motion at each pause in the rotary motion, and decorating means with which the tiles are brought into active relation at each pause of the rotary movement of the frame.

4. In a machine for decorating or glazing tiles and the like, a frame or bed, a central shaft carried thereby, a tile-carrying frame rotatably mounted on the shaft, a cam mounted on said tile-carrying frame provided with inclined grooves, a stationary frame, rollers carried thereby engaging the grooves of the cam, and means for giving a rising and falling motion to the cam and tile-carrying frame.

5. In a machine for decorating or glazing tiles and other objects, a frame or bed, a central shaft carried thereby, a tile-carrying frame rotatably mounted on the shaft, a cam mounted on said tile-carrying frame provided with inclined grooves, a stationary frame, rollers carried thereby engaging the grooves of the cam, and means for giving a rising and falling motion to the cam and tile-carrying frame comprising a suitably-operated pivoted weighted lever having connection with the tile-carrying frame.

6. In a machine for decorating or glazing tiles or other objects, a shaft, a cam mounted thereon and capable of a rising and falling movement, said cam being provided with V-shaped grooves, a stationary frame having rollers coacting with the grooves of the cam.

7. In a machine for decorating tiles or other objects, a shaft, a cam mounted thereon provided with V-shaped grooves on its periphery, a sleeve loosely mounted on the shaft and supporting said cam, a pivoted weighted lever engaging the said sleeve, a second cam engaging the lever, and worm-gear for operating said cam.

8. In a machine for decorating or glazing tiles or other objects, a tile-carrying frame having a rising and a falling movement and an independent rotary movement, and mechanism for gripping and releasing the tiles carried by said frame.

9. In a machine for decorating or glazing tiles or other objects, gripping and releasing mechanism comprising a plate, levers carried by said plate provided with pins to engage with the tile or tiles, and a spring-controlled rod and links adapted to operate the said levers, a tile-carrying frame, and pins secured to the tile-carrying frame and adapted to engage holes in said plate.

10. In a machine for decorating or glazing tiles and other objects, a central stationary frame, color-receptacle having stationary brushes and rotatable flipping or spraying arms which lift the glaze or color onto the stationary brushes, rotatable shafts, wheels carried by said shafts in engagement with each other, clutches formed on the wheels and on the shafts carrying the rotatable flipping or spraying arms, and a bevel-wheel mounted on one of the aforesaid shafts carrying the engaging wheels, a larger bevel-wheel mounted on the central stationary frame of the machine and gearing with the first-mentioned bevel-wheels and means for giving the larger bevel-wheel an intermittent motion.

11. In a machine for decorating tiles and other objects, means for giving a variable intermittent motion to the glaze spraying flipping or brushing mechanism, comprising a constantly-rotating shaft, a friction-roller carried by said shaft, a friction-disk adapted to receive motion from the said friction-roller and provided on its surface with a non-concentric extension, a pivoted lever engaged by said extension, a slidable clutch on the main driving-shaft operated by the lever, a bevel-pinion carried by the main driving-shaft and having a clutch-face to be engaged by the clutch, and a weight on the pivoted lever to release the clutch.

12. In a machine for decorating or glazing tiles and other objects tile gripping and releasing mechanism comprising a plate, levers carried by said plate provided with pins to engage with the tile and a spring-controlled rod and links adapted to operate the said levers substantially as and for the purposes described.

13. In a machine for decorating or glazing tiles and other objects tile gripping and releasing mechanism comprising a plate, ribs or projections formed on the face of the plate, two pairs of levers carried by said plate provided with pins to engage with the tiles, projecting ribs formed on the face of the plate and a spring-controlled rod having links connecting it with one pair of the levers and projecting pins connecting it with the other pair of levers substantially as and for the purpose described.

14. In a machine for decorating or glazing tiles and other objects a tile-carrying frame having a rising and falling and rotary movement, provided with a series of holes adapted to receive and hold in position a series of removable plates carrying tile gripping and releasing mechanism substantially as described.

15. In a machine for decorating or glazing tiles and other objects the combination with a tile-carrying frame having a rising and falling and rotary movement and provided with holes, of a series of plates carrying tile gripping and releasing mechanism mounted in the holes and adapted to partake of the rising and falling and rotary movement of the tile-carrying frame substantially as and for the purposes described.

16. In a machine for decorating or glazing tiles and other objects, tile gripping and releasing mechanism having spring-controlled rods, means for operating same comprising a rotatable cam, pivoted levers in engagement with the cam, other levers pivoted on the frame of the machine engaging with the first-named levers and having their free ends adapted to engage with the spring-controlled rods of tile-gripping mechanism substantially as described.

17. In a machine for decorating or glazing tiles and other objects the combination with tile gripping and releasing mechanism having spring-controlled rods and with the means for operating such mechanism, said means comprising pivoted levers, of a rotary frame adapted to rise and fall so as to bring the spring-controlled rods of the tile-gripping mechanism into contact with the pivoted levers of the mechanism for operating the tile gripping and releasing mechanism substantially as described.

18. In a machine for decorating or glazing tiles and other objects the combination of a bed or frame carrying a central shaft or stud, a tile-carrying frame mounted on said shaft and adapted to receive a rising and falling and rotary movement, a series of plates carried by the frame provided with tile gripping and releasing mechanism, means for operating the tile gripping and releasing mechanism and means for operating the latter substantially as described.

19. In a machine for decorating or glazing tiles and other objects means for spraying, flipping or brushing the glaze or colors onto the tiles consisting of a glaze or color receptacle one or more stationary brushes and rotatable arms adapted to lift up the glaze or color onto the stationary brushes and to bend the bristles of the latter so as to discharge the glaze through an opening in the receptacle substantially as and for the purposes described.

20. In a machine for decorating or glazing tiles and other objects the combination with the color or glaze receptacle, stationary brushes and rotatable arms engageable therewith of weighted arms connected to said rotatable arms at different angles substantially as and for the purpose described.

21. In a machine for decorating or glazing tiles and other objects the combination with glaze or color spraying or flipping mechanism and with a stencil-plate carried by the latter of a tile-carrying frame adapted to receive a rising and falling and rotary motion so as to cause the tiles carried by it to act as a seal to the color or glaze receptacle and prevent the color or glaze from escaping from the color-receptacle except through the pattern or patterns in the stencil plate or plates and upon the tiles substantially as described.

22. In a machine for decorating or glazing tiles and other objects the combination of a series of color or glaze receptacles provided with means for spraying flipping or brushing the color or glaze onto the tiles and operated by bevel-wheels, of a centrally-arranged bevel-wheel in gear with all the bevel-wheels of the color-distributing devices and adapted to receive motion from the main driving-shaft of the machine so as to cause the various colors or glazes to be sprayed flipped or brushed simultaneously onto the different tiles substantially as described.

23. In a machine for decorating or glazing tiles and other objects means for varying the time during which the glaze or color shall be sprayed flipped or brushed onto the tiles comprising a friction-disk a constantly-rotating shaft, a slidable friction-roller mounted on said shaft engaging with the friction-disk and adapted to be moved across the face of such disk so as to bring it nearer to its center or periphery substantially as described.

24. In a machine for decorating or glazing tiles and other objects a color or glaze receptacle having rotatable spraying or flipping arms means for supplying the color or glaze receptacle with color or glaze comprising a supply-tank an endless rotatable band suspended from the shaft of one of the rotatable spraying or flipping arms, a bobbin or roller suspended in the loop of the endless band so as to keep it immersed in the supply-tank, agitating-vanes carried by said roller a scraper on the color-receptacle adapted to come in contact with the rotatable band so as to remove the color therefrom and a spout to lead it into the color or glaze receptacle substantially as described.

25. In a machine for decorating or glazing tiles or other objects the means for giving a design, variegated or "mottled" color effect on the tile or other object comprising a receptacle for the color provided with an opening or openings across which the tile or other object is placed, a brush or roller located in the color or glaze receptacle provided with resilient projections of different lengths and adapted to be rotated in the color-receptacle and traversed beneath the tile or other object, a pinion carried by the axle of the brush or roller engaging with a rack carried by the color or glaze receptacle, and a suitably-operated crank-arm connected to the brush for moving it along the rack.

26. In a machine for decorating or glazing tiles and other objects the combination with a tile-carrying frame adapted to receive a rising and falling and rotary motion of one or more automatically-operated tile feeding and receiving tables substantially as described.

27. In a machine for decorating or glazing tiles and other objects a tile gripping and releasing mechanism, a tile feeding and receiving mechanism comprising a rotatable shaft carrying a table, and tile carriers or plates mounted in said table adapted to be brought into position beneath the tile gripping and releasing mechanism substantially as described.

28. In a machine for decorating or glazing tiles and other objects the combination with a rotatable feed-table having tile-gripping mechanism of tile carrying and receiving plates comprising plates provided with mats on which the tiles are placed, spring-shanks projecting from said plates through the feed-table and means for engaging the shanks whereby the plates are raised to present the tiles to the tile-gripping mechanism and to receive the tiles discharged by the latter substantially as described.

29. In a machine for decorating or glazing tiles and other objects the combination with the feed-tables and tile-carrying plates having spring-shanks, of means for lifting the tile-carrying plates into position for presenting the tiles said means comprising a rotatable shaft carrying a cam engaging with a pivoted lever said lever in turn engaging with the under side of the spring-shanks of said tile-carrying plates substantially as described.

30. In a machine for decorating or glazing tiles and other objects, a pair of tile-feeding tables, means for giving intermittent rotation to the tile-feeding tables comprising a train of wheels operated by the driving-shaft of the machine, a second shaft loosely carrying the last wheel of the train, bevel-wheels located on said shaft engaging with similar wheels on the shafts of the feed-tables, a clutch-face forming part of the last wheel of the train and a slidable clutch on the second shaft substantially as described.

31. In a machine for decorating or glazing tiles and other objects the combination with the feed-tables having tile-gripping mechanism of rotatably-mounted felt or similar rollers resting in troughs containing water and adapted to clean the tile-gripping mechanism as the tables are rotated substantially as described.

32. In a machine for decorating or glazing tiles and other objects the means for cleaning the stencils of any superfluous glaze or color resting thereon after the spraying or flipping operation comprising a series of spring-controlled brushes or wipers and rising and falling and rotatable tile-carrying frames having projections to engage the wipers substantially as described.

33. In a machine for decorating or glazing tiles and other objects, the combination with a tile-gripping mechanism, of two rotatable feed-tables provided with tile-carrying plates having spring-shanks, means for operating or lifting one plate of each table into position to enable the tiles to be gripped simultaneously by the tile-gripping mechanism comprising a projection on one of the spring-shanks of the tile-carrying plates, and a pair of slidable rods connected by links adapted to rise beneath the shanks of the tile-carrying plates.

34. In a machine for decorating or glazing tiles and other objects, feed-tables, mechanism for driving same comprising a train of gears, means for engaging and disengaging the mechanism, for driving the feed-tables comprising a clutch-face formed on a boss of the last wheel of the driving-train, a clutch slidable on the shaft thereof, a pivoted lever engaging with said clutch, a slidable spring-controlled lever engaged by the pivoted lever, a catch on said slidable lever, a rising and falling rotatable tile-frame, an arm moved thereby and adapted to come into contact with the catch on the slidable lever, a cam on the clutch-shaft, and a slidable rod operated by the cam and adapted to disengage the slidable lever from the arm.

In witness whereof I have hereunto set my hand in the presence of two witnesses.

FREDERICK MOUNTFORD.

Witnesses:
WILLIAM H. TAYLOR,
JAS. STEWART BROADFOOT.